US012693013B1

(12) United States Patent
Duggan

(10) Patent No.: US 12,693,013 B1
(45) Date of Patent: Jul. 28, 2026

(54) SAND GLASS CANDLE EXTINGUISHER

(71) Applicant: James Edmund Duggan, Atlanta, GA (US)

(72) Inventor: James Edmund Duggan, Atlanta, GA (US)

( * ) Notice: Subject to any disclaimer, the term of this patent is extended or adjusted under 35 U.S.C. 154(b) by 675 days.

(21) Appl. No.: 17/696,530

(22) Filed: Mar. 16, 2022

(51) Int. Cl.
*F23Q 25/00* (2006.01)
*G04F 1/06* (2006.01)

(52) U.S. Cl.
CPC ............... *F23Q 25/00* (2013.01); *G04F 1/06* (2013.01)

(58) Field of Classification Search
CPC ........................................................ F23Q 25/00
USPC ...................................... 431/33–35, 144–152
See application file for complete search history.

(56) References Cited

U.S. PATENT DOCUMENTS

| | | | | |
|---|---|---|---|---|
| 5,944,505 A * | 8/1999 | Kroecher | F23Q 25/00 | 431/35 |
| 6,572,365 B1 * | 6/2003 | Byxbe | F23Q 25/00 | 431/291 |
| 8,469,701 B2 * | 6/2013 | Quinn | F23D 3/16 | 431/35 |
| 10,619,851 B1 * | 4/2020 | Egger | F23Q 25/00 | |
| 2007/0031769 A1 * | 2/2007 | Burton | F23Q 25/00 | 431/144 |
| 2007/0184395 A1 * | 8/2007 | Taylor | F23D 3/16 | 431/291 |
| 2018/0031236 A1 * | 2/2018 | Gaudioso | F23N 5/20 | |

* cited by examiner

*Primary Examiner* — Ko-Wei Lin

(57) ABSTRACT

A device for extinguishing a candle by using the rotational movement of a sand glass. The gravitational flow of sand within the sand glass causes the sand glass to rotate, and after a period of time to contact and release a latch holding a candle snuffer over a flame. The device provides a simple, practical, and interesting way to extinguish a candle.

1 Claim, 3 Drawing Sheets

SAND GLASS CANDLE EXTINGUISHER

BACKGROUND—PRIOR ART

The following is a tabulation of some prior art relating to automatic candle extinguishers:

Patent Number Issue Date Inventor

U.S. Pat. No. 1,101,296 1914-06-23 Liaci
U.S. Pat. No. 1,211,156 1917-01-2 Hosking
US886198 1908-04-28 Findlay
U.S. Pat. No. 6,572,365 2003-06-3 Byxbe
U.S. Pat. No. 5,944,505 1999-08-31 Kroecher
2007/0031769 2007-02-8 Burton et al
2007/0184395 2007-08-9 Taylor
U.S. Ser. No. 10/619,851 2020-04-14 Egger
U.S. Pat. No. 8,469,701 2013-06-25 Quinn et al
2018/0031236 2018-02-1 Gaudioso The tabulation of prior art lists patents covering many variations of automatic candle extinguishers, some being completely mechanical and others utilizing a combination of mechanics and electrical circuitry. None of the discovered prior art employs the use of a sand glass in a candle extinguisher.

The two primary components in my candle extinguisher are a candle and a sand glass. Both have historical significance. Wicked candles have been in common use since Roman times as a source of illumination and were also one of the earliest means of measuring time by use of graduated candle markings. Today candles are widely used as light sources, decorative objects, mood enhancers, and ceremonial tools.

Sand glasses were a primary source of time keeping from the early 1300's until the 1600's. Sand glasses remain popular today as historical instruments that symbolize the passage of time and as fascinating and functional art objects.

My invention is the first to combine these two historical elements in an interesting and practical automatic candle extinguisher.

DRAWINGS—FIGURES

DRAWINGS—REFERENCE NUMERALS

20—sand glass 36—sand glass arbor
22—candle snuffer 38—sand glass support post
24—pivoting latch 40—candle snuffer arbor
26—folding support 42—candle snuffer support post
28—candle container 44—pivoting latch arbor
30—candle 46—pivoting latch support post
32—base 48—folding support arbor
34—sand glass collar 50—folding support post

DETAILED DESCRIPTION-FIGS. 1,2,3,4

Figure 1:
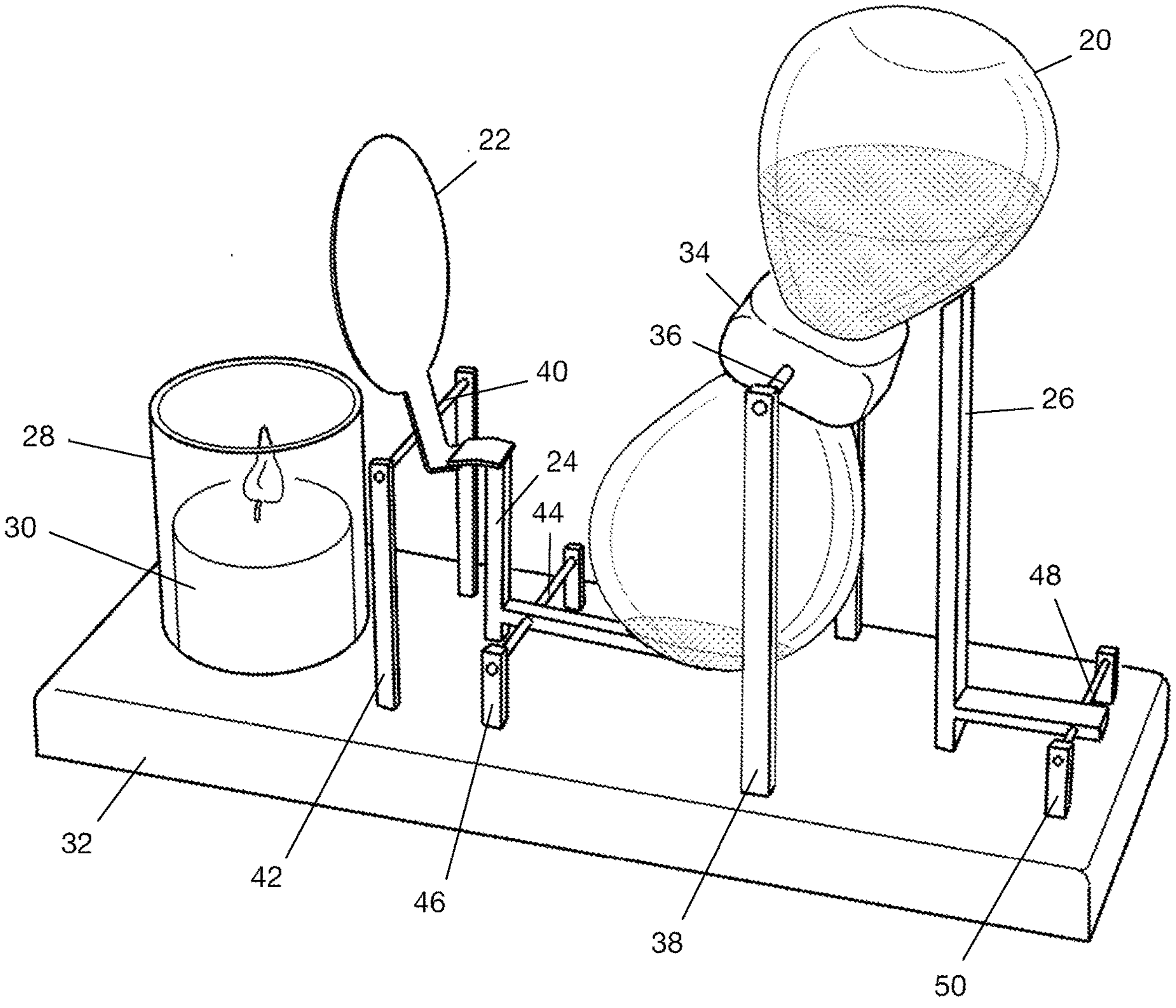
FIG. 1 is a perspective view of the Sand Glass Candle Extinguisher showing the beginning operation of the sand glass with the candle snuffer up and latched and with the folding support up.
Figure 2:
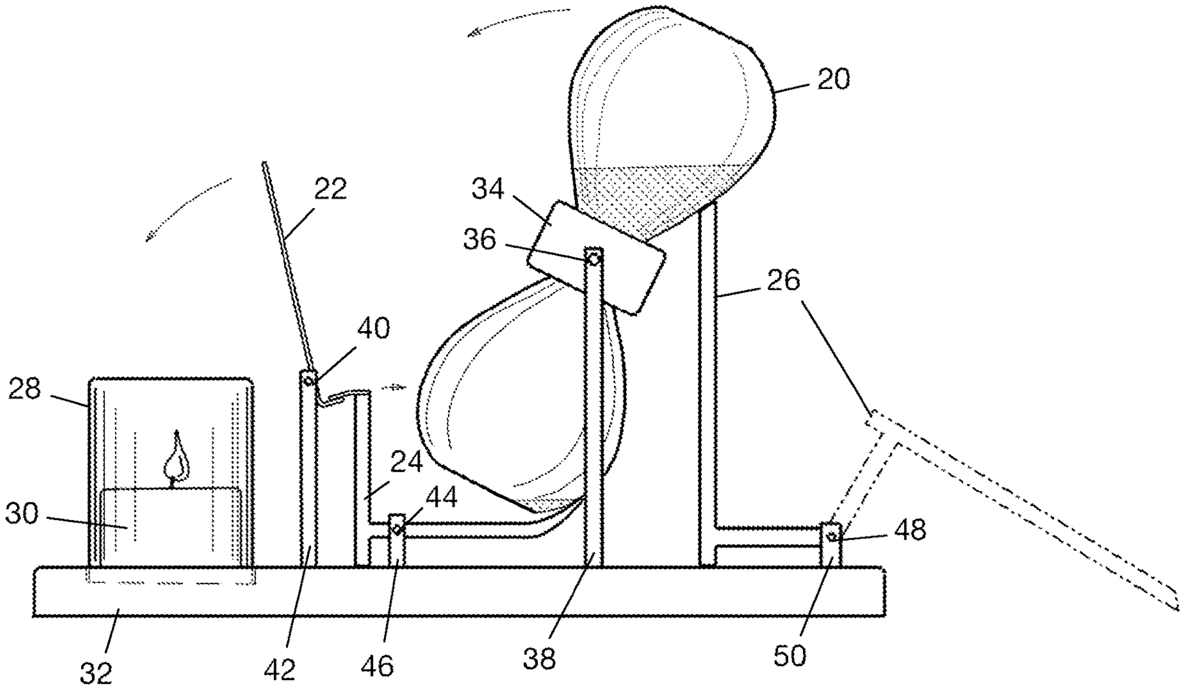
FIG. 2 is a side view of the device showing the beginning operating position of the components as shown in FIG. 1.
Figure 4:
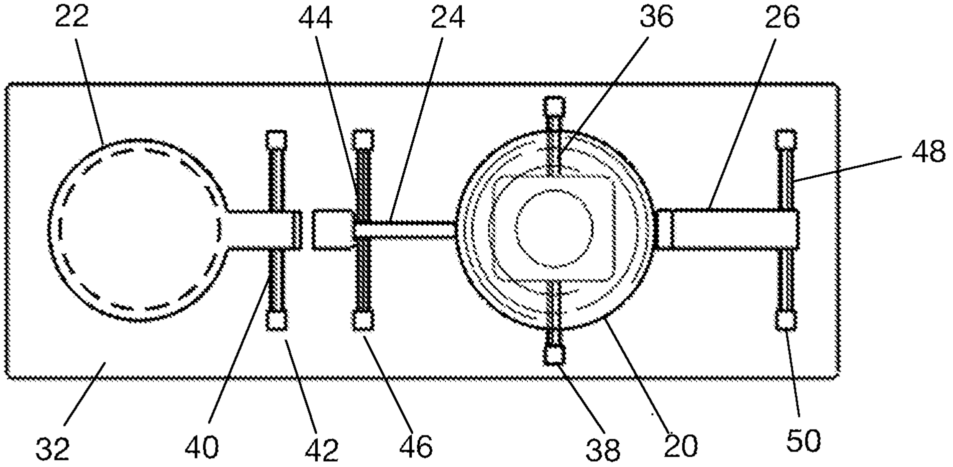
FIG. 4 is a top view of FIG. 3.
Figure 3:
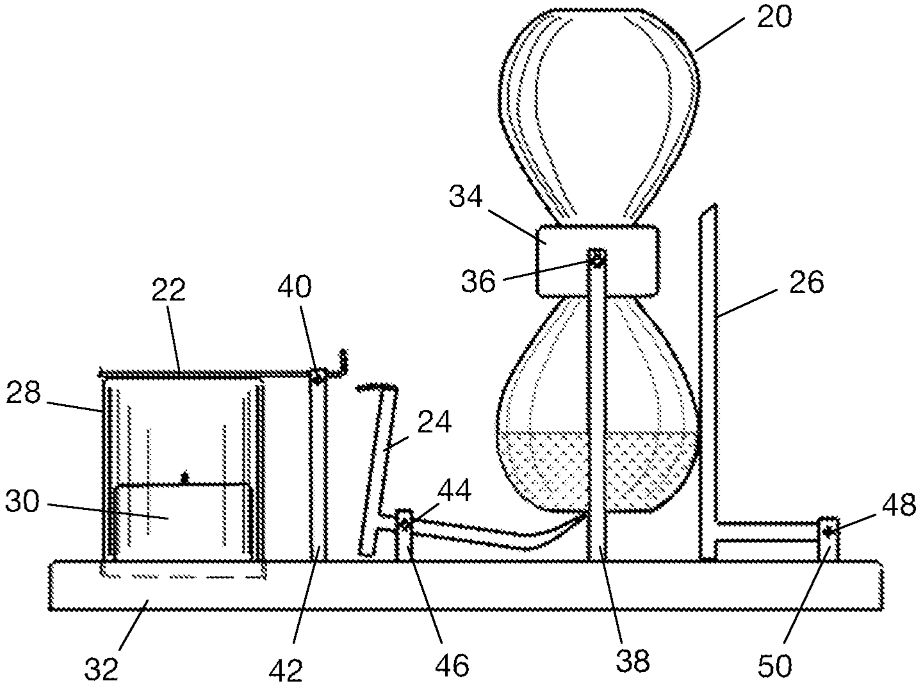
FIG. 3 is a side view of the device showing the position of components after candle has been extinguished.

One embodiment of Sand Glass Candle Extinguisher is illustrated in FIGS. 1, 2, 3, and 4. Base 32 provides a pocket to establish the position of candle container 28 and candle 30. Two candle snuffer support posts 42 support the candle snuffer arbor 40 attached to candle snuffer 22. Two pivoting latch support posts 46 support the pivoting latch arbor 44 attached to pivoting latch 24. Two sand glass support posts 38 support the sand glass arbor 36 attached to both sides of sand glass collar 34 which captures sand glass 20. Two folding support posts 50 support folding support arbor 48 attached to folding support 26.

Operation-FIGS. 1,2,3,4

The first steps in the operation of Sand Glass Candle Extinguisher are to fold down folding support 26, to rotate sand glass 20 so that the chamber containing sand is on top, and to fold back up folding support 26. Next candle snuffer 22 is rotated up and secured in the up position by pivoting latch 24. The candle 30 is then lit. As the gravitational flow of sand within sand glass 20 flows into the lower chamber, the weight of the lower chamber increases, and the weight of the upper chamber decreases, causing the sand glass 20 to rotate on arbor 36. As sand glass 20 becomes more vertical, it presses down on pivoting latch 24, causing pivoting latch 24 to release candle snuffer 22, and the candle 30 is extinguished.

I claim:

1. An automatic candle extinguishing device comprising:
a. a candle
b. a candle snuffer for extinguishing flame of said candle
c. a latch for holding said candle snuffer over said candle
d. a sand glass which rotates when flow of sand within said sand glass causes a shift in weight from one end of said sand glass to other end, whereby said sand glass contacts said latch causing said latch to release said candle snuffer thereby extinguishing said candle.

* * * * *